(12) United States Patent
Baset et al.

(10) Patent No.: US 9,998,561 B2
(45) Date of Patent: *Jun. 12, 2018

(54) ENABLING ACCESS TO USER-CHOSEN AND/OR PREFERRED CONTENT VIA REMOTE TRUSTED THIRD-PARTY SYSTEMS

(71) Applicant: International Business Machines Corporation, Armonk, NY (US)

(72) Inventors: Salman A. Baset, New York, NY (US); Sambit Sahu, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 131 days.

This patent is subject to a terminal disclaimer.

(21) Appl. No.: 13/966,828

(22) Filed: Aug. 14, 2013

(65) Prior Publication Data
US 2014/0215022 A1    Jul. 31, 2014

Related U.S. Application Data

(63) Continuation of application No. 13/755,121, filed on Jan. 31, 2013.

(51) Int. Cl.
*G06F 15/16* (2006.01)
*H04L 29/08* (2006.01)
(Continued)

(52) U.S. Cl.
CPC .............. *H04L 67/32* (2013.01); *G06F 21/31* (2013.01); *H04L 67/06* (2013.01); *H04L 67/306* (2013.01);
(Continued)

(58) Field of Classification Search
CPC ... H04L 29/08; H04L 29/08072; H04L 29/06; H04L 29/0809; H04L 29/08117;
(Continued)

(56) References Cited

U.S. PATENT DOCUMENTS 8,447,801 B1      5/2013  Roche
8,577,732 B1 *  11/2013  Martin ............... G06Q 30/0202
                                                                705/14.25

(Continued)

OTHER PUBLICATIONS

Gogo WiFi. http://en.wikipedia.org/wiki/Gogo_Inflight_Internet.
(Continued)

*Primary Examiner* — Dhairya A Patel
(74) *Attorney, Agent, or Firm* — Ryan, Mason & Lewis, LLP

(57) ABSTRACT

Systems and articles of manufacture for enabling access to user-specified and/or user-chosen content via remote third-party systems include communicating with a content provider via use of one or more user credentials, wherein the content provider maintains a list of user content choices and one or more preferences for content, wherein the content is generated by the user and/or by the content provider and/or by one or more other users, automatically downloading an amount of user-specified and/or user-chosen content from the list of user content choices and one or more preferences to a primary enterprise system and/or a secondary enterprise system in conjunction with an interaction between the user and the primary enterprise system, and providing access to the downloaded user-specified and/or user-chosen content to the user in conjunction with an interaction between the user and the secondary enterprise system, the content provider and/or the primary enterprise system.

17 Claims, 3 Drawing Sheets

(51) Int. Cl.
*G06F 21/31* (2013.01)
*H04N 21/414* (2011.01)
*H04N 21/472* (2011.01)

(52) U.S. Cl.
CPC ..... *H04N 21/41422* (2013.01); *H04N 21/472* (2013.01)

(58) Field of Classification Search
CPC ......... H04L 67/32; H04L 67/02; H04L 67/42; H04L 67/34; H04L 67/1002; H04L 65/4084; H04L 2029/06054
USPC .......................................... 709/219, 220, 224
See application file for complete search history.

(56) References Cited

U.S. PATENT DOCUMENTS

| | | | | |
|---|---|---|---|---|
| 8,655,970 | B1* | 2/2014 | Cohen | G06Q 30/00 455/412.2 |
| 8,739,229 | B2* | 5/2014 | Ogilvie | H04N 7/15 725/74 |
| 2002/0095680 | A1 | 7/2002 | Davidson | |
| 2002/0178451 | A1 | 11/2002 | Ficco | |
| 2003/0192052 | A1 | 10/2003 | Frisco | |
| 2007/0234391 | A1 | 10/2007 | Kalantri et al. | |
| 2008/0103974 | A1* | 5/2008 | Fridhendler | H04N 7/17318 705/52 |
| 2008/0168129 | A1* | 7/2008 | Robbin | H04L 65/60 709/203 |
| 2008/0208985 | A1 | 8/2008 | Georgis | |
| 2009/0234831 | A1 | 9/2009 | Ebadollahi | |
| 2009/0234863 | A1* | 9/2009 | Evans | G06Q 10/107 |
| 2010/0174722 | A1 | 7/2010 | Carteri | |
| 2010/0325557 | A1* | 12/2010 | Sibillo | G06F 3/0481 715/751 |
| 2011/0060845 | A1 | 3/2011 | Jungck | |
| 2011/0231478 | A1* | 9/2011 | Wheeler | G06F 17/30864 709/203 |
| 2011/0276993 | A1 | 11/2011 | Ferguson | |
| 2011/0302596 | A1 | 12/2011 | Lundgren | |
| 2012/0137325 | A1 | 5/2012 | Ogilvie | |
| 2012/0259951 | A1* | 10/2012 | Schalk | G07C 5/008 709/217 |
| 2013/0124371 | A1 | 5/2013 | Mehta | |
| 2013/0212671 | A1* | 8/2013 | Wang | G06F 21/70 726/16 |
| 2013/0326350 | A1 | 12/2013 | Roberts et al. | |
| 2014/0067997 | A1 | 3/2014 | Saabas | |
| 2014/0215507 | A1 | 7/2014 | Wouhaybi | |

OTHER PUBLICATIONS

Entertainment on Demand, American Airlines. https://www.aa.com/i18n/urls/entertainmentOnDemand.jsp?anchorLocation=DirectURL&title=wifi#!eod.

Norwegian airlines to move inflight system to WiFi, New York Times, Oct. 30, 2012. https://www.nytimes.com/2012/10/31/business/global/norwegian-airline-to-move-entertainment-system-to-wi-fi.html.

Amazon instant video. http://www.amazon.com/gp/video/ontv/player.

* cited by examiner

ENABLING ACCESS TO USER-CHOSEN AND/OR PREFERRED CONTENT VIA REMOTE TRUSTED THIRD-PARTY SYSTEMS

CROSS-REFERENCE TO RELATED APPLICATIONS

This application is a continuation of U.S. patent application Ser. No. 13/755,121, filed Jan. 31, 2013, and incorporated by reference herein.

FIELD OF THE INVENTION

Embodiments of the invention generally relate to information technology, and, more particularly, to management of personalized content.

BACKGROUND

An increasing trend in the multimedia industry is directed towards users viewing content on-demand. With the proliferation of streaming services such as, for example, NetFlix®, Amazon® Instant Video, and Hulu®, a user can stream movies directly to a personal device such as a laptop computer, a tablet computer, a smart phone, etc. Additionally, users are increasingly attempting to use such personal devices at remote locations such as airplanes, and connecting to a network resource such as the Internet via Wi-Fi. Accordingly, users may desire to view user-chosen and/or user-preferred content maintained by streaming services at remote locations such as on an airplane instead of relying on the multimedia programming provided by airlines or other such third-party entities.

However, the ability of a user to utilize a personal device at a remote location such as an airplane faces significant challenges; notably, the Internet connectivity on airplanes, for example, cannot sustain high- or even low-definition video content due to bandwidth issues. As such, while airlines are increasingly providing in-flight Wi-Fi, the limited speeds of such Wi-Fi prevent a user from successfully viewing many forms of multimedia content.

A user can adapt to such situations by downloading content onto his or her personal device prior to arriving at the remote location. However, in such scenarios, the user is thereby limited to access only to the specific content that he or she downloaded prior to arriving. Additionally, downloading content onto one's personal device beforehand requires forethought as well as sufficient time to fully carry out such downloading activities, and such considerations might be undesirable or even unavailable to a user depending on the specific circumstances. Moreover, the download of a high-definition multimedia content consumes significant space on tablet devices.

Accordingly, a need exists to enable a user to access his or her personalized content on his or her own personal device on-demand from a content service via remote systems such as on an airplane by circumventing common Internet connectivity bottleneck issues.

SUMMARY

In one aspect of the present invention, techniques for enabling access to user-specified and/or user-chosen content via third-party systems are provided. An exemplary computer-implemented method for enabling user access to user-specified and/or user-chosen content at a remote location can include steps of communicating with a content provider via use of one or more user credentials, wherein the content provider maintains a list of user content choices and one or more preferences for content, wherein the content is generated by the user and/or by the content provider and/or by one or more other users, automatically downloading an amount of user-specified and/or user-chosen content from the list of user content choices and one or more preferences to a primary enterprise system and/or a secondary enterprise system in conjunction with an interaction between the user and the primary enterprise system, and providing access to the downloaded user-specified and/or user-chosen content to the user in conjunction with an interaction between the user and the secondary enterprise system, the content provider and/or the primary enterprise system.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and operative to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
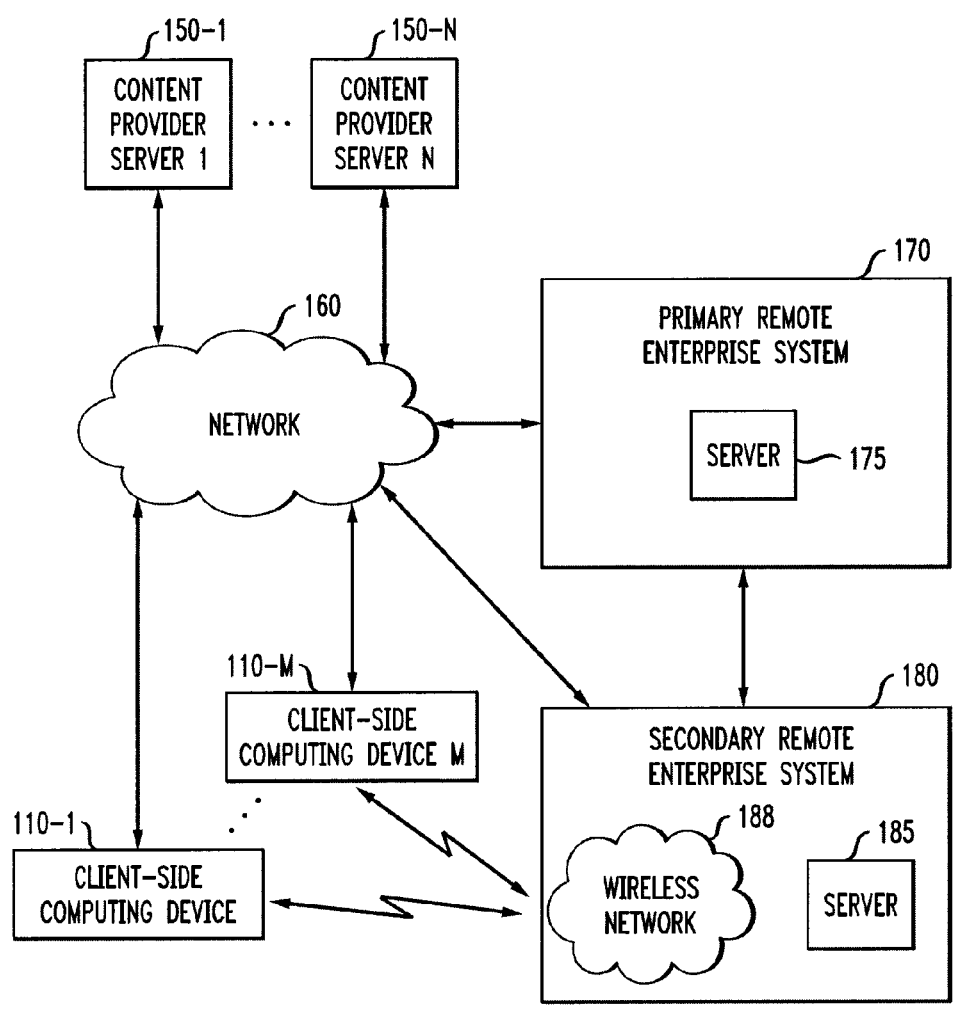
FIG. 1 is a block diagram illustrating an example embodiment, according to an aspect of the invention.

As described herein, an aspect of the present invention includes enabling access to user-specified and/or user-chosen content at remote locations such as on an airplane. For example, a user can modify a list of movies or other video programming on different content providers, a user can choose which directories of a file hosting and/or storage service account he or she would like to be made available, etc.

In at least one embodiment of the invention, a user's personalized content queue, as maintained via a content provider and/or streaming/queuing service (such as, for example, NetFlix®, Amazon® Instant Video, iTunes® or Hulu®), is linked with an airline's ticketing, reservation, and/or boarding system. As used herein, content refers generally to media and content that includes any combination of text, audio, still images, animation, video, documents, files, and/or interactivity content forms. By way merely of example, this can include movies, television programs, Internet-based programs and/or websites, interactive games, electronic and/or audio books or articles, music programming, presentations, etc.

By way of illustration, consider the following example. When a user purchases an airline ticket, he or she can also enter credentials associated with his or her account with a content streaming/queuing service. Alternatively, the streaming/queuing service credential can be previously stored by the user with the airlines (for example, on a server of the airline system). Subsequently, prior to or upon the user boarding a flight, the airline downloads a predetermined amount of content (for example, the first X number of movies) from a queue associated with the user's account on the streaming/queuing service; more specifically, the airline downloads this content onto the server of the airplane upon which the user has boarded or is to board.

In at least one embodiment of the invention, the airline can also give the user an option, upon or during the reservation process, to select the content that he or she would like to access during the corresponding flight. Accordingly, the airline can create a list or a sub-list of content from the user's queue (via a user account with a streaming/queuing service), apply any filtering (for example, based on content rating (PG movies, etc.) according to enterprise policy, and download and store the content on the in-plane server. Once the user is on the plane, the user can then access that content directly from the in-plane server via a personal device (a laptop computer, a tablet computer, a smart phone, etc.) of his or her choosing.

Additionally, in at least one embodiment of the invention, the airline can also present to the user, upon or during the reservation process, a list of content that other users have requested or accessed from an online library, thereby creating a social experience. In at least one embodiment of the invention, the airline can pull-up a movie list pertaining to different users. Also, at least one embodiment of the invention can include enabling an airline to determine (via utilization an appropriate machine learning algorithm, for example) certain content that is likely to be watched by multiple users, and storing such content on an in-plane server for user access during one or more flights.

Accordingly, rather than simply inputting user preferences, one or more embodiments of the invention include linking existing user preferences and user-specified and/or user-chosen content from a content provider and/or streaming/queuing service with one or more personal devices of the user being used in remote locations such as on an airplane, thereby allowing the user to access the user-specified and/or user-chosen content at the remote location on a personal device of his or her choosing.

FIG. 1 is a block diagram illustrating an example embodiment, according to an aspect of the invention. By way of illustration, FIG. 1 depicts example client-side computing devices (CSCD) 110-1 through 110-M (hereinafter, collectively referred to as CSCD 110) communicating with content provider servers 150-1 through 150-N (hereinafter, collectively referred to as content provider servers 150) and a primary remote enterprise system 170 (which includes a server 175) over a network 160. The network 160, may comprise, for example, a global computer network such as the Internet, a wide area network (WAN), a local area network (LAN), a satellite network, a telephone or cable network, or various portions or combinations of these and other types of networks. Additionally, FIG. 1 also depicts a secondary remote enterprise system 180, which includes a server 185 and a wireless network 188 through which the secondary system 180 can communicate with CSCD 110. Additionally, while shown as a wireless network for purposes of the FIG. 1 illustration, it should be appreciated that the network 188 in the secondary remote enterprise system 180 can also be implemented via a wired connection.

It is to be appreciated that a given embodiment of the disclosed system may include multiple instances of CSCD 110, content provider servers 150, primary remote enterprise system 170 and secondary remote enterprise system 180, as well as possibly other system components, although the instances of such components are shown in the simplified system diagram of FIG. 1 for clarity of illustration.

In an example implementation, a user authenticates with one or a plurality of the content provider servers 150 using credentials corresponding to an account with the relevant content provider (that is, the content provider associated with the particular server 150 in question) maintained by the user. By way of example, the user of the CSCD 110 is authenticated using credentials such as a password, a username/password combination, a security token, etc.

Accordingly, while at least one embodiment of the present invention is illustrated herein using CSCD 110, content provider servers 150, and primary remote enterprise system 170 electrically connected to network 160 (as well as systems 170 and 180 being shown as electrically connected to each other), other implementations are within the scope of the present invention, as would be apparent to a person of ordinary skill in the art. Similarly, the secondary remote enterprise system 180 is depicted in FIG. 1 as connecting wirelessly via network 188 to CSCD 110, but other implementations (such as electrically connecting) are within the scope of the present invention, as would be apparent to a person of ordinary skill in the art.

The CSCD 110 may represent a portable personal device, such as a mobile telephone, personal digital assistant (PDA), wireless email device, game console, tablet computer, etc. The CSCD 110 may also represent a laptop personal computer (PC), a microcomputer, a workstation, a television set top box, an in-flight entertainment device, a wired telephone or any other information processing device which can benefit from the use of the techniques detailed herein in accordance with the invention. The CSCD 110 may also be referred to herein as simply a "user." The term "user," as used in this context, should be understood to encompass, by way of example and without limitation, a user device, a person utilizing or otherwise associated with the device, or a combination of both. An operation described herein as being performed by a user may therefore, for example, be performed by a user device, a person utilizing or otherwise associated with the device, or by a combination of both the person and the device. Similarly, a password or other authentication information described as being associated with a user may, for example, be associated with a CSCD device 110, a person utilizing or otherwise associated with the device, or a combination of both the person and the device.

In at least one embodiment of the invention, primary remote enterprise system 170 includes a ground system such as, for example, an airline's enterprise system. Additionally, in at least one embodiment of the invention, secondary remote enterprise system 180 includes an on-board system such as, for example, a system associated with and/or implemented on an individual airplane (that is, one of potentially multiple airplanes within the overall airline enterprise).

As noted herein, primary remote enterprise system 170 includes server 175 and secondary remote enterprise system

Figure 3:
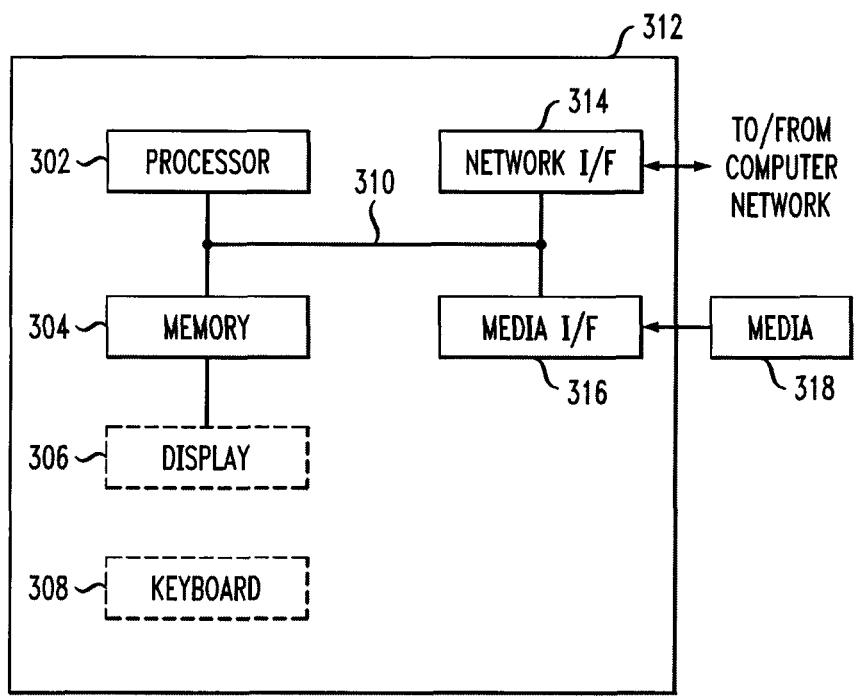
FIG. 3 is a system diagram of an exemplary computer system on which at least one embodiment of the invention can be implemented.

180 includes server 185. In each instance, the server (175 and/or 185) can include a physical data processing system (such as, for example, system 312 as shown in FIG. 3) running a server program. Additionally, such a server can also include one or more of a database and/or storage component capable of storing and/or maintaining information and material such as described herein in connection with embodiments of the invention (such as user information, user credentials, enterprise information, remote system information, content, preferences for a user, etc.).

In connection with the components depicted in FIG. 1, an example embodiment of the invention may include the following sequence. A user (or CSCD 110) accesses primary remote enterprise system 170, such as an airline system, through network 160. Independently, the user has and/or maintains an account with a content provider and/or streaming/queuing service. Accordingly, during an interaction with the primary remote enterprise system 170 (for example, when the user makes a flight reservation or when the user obtains a boarding pass for a flight), the user provides primary remote enterprise system 170 (for example, the airline system) with his or her credentials that can be used to access the user's account with a content provider and/ore streaming/queuing service. Primary system 170 stores user credentials. Such storage can constitute a pre-determined, limited amount of time, a use-based limited amount of time, and/or an indefinite or unspecified amount of time so as for repeated use during subsequent interactions (for example, additional flights) between the system (the airline) and the user.

Subsequent to the initial interaction (for example, flight reservation) between the primary system 170 (airline) and the user, the primary system 170 communicates with the relevant content provider server 150 via use of the received user credentials. Additionally, for example, the airline can have pre-determined arrangements and/or agreements with certain content providers so as to facilitate this process. This communication can occur at a variety of times such as immediately following the initial interaction (flight reservation), upon generating a boarding pass for the user, etc. Additionally, during this communication between the primary system 170 (airline) and the relevant content provider server 150, the primary system 170 can download an amount of user-specified and/or user-chosen content from the content provider server 150 to a server 185 of the secondary remote enterprise system 180. As detailed herein, the content provider may also locate a copy of its partial or full content at an airport for enabling faster downloads. In this example embodiment, the secondary remote enterprise system 180 is an individual airplane within the airline's fleet of airplanes. Specifically, in this instance, the secondary remote enterprise system 180 is the particular airplane for which the user has made his or her reservation.

The downloading of user-specified and/or user-chosen content from the content provider server 150 to server 185 of the secondary remote enterprise system 180 can be carried out in a number of ways, in accordance with one or more embodiments of the invention. By way of example, the top X number of content items from the user's queue can be automatically downloaded to the plane's server 185, or a user-specified sub-set of content can be automatically downloaded to the plane's server 185. Accordingly, an aspect of the invention includes linking a user's specified and/or chosen content queue and/or account (maintained by content provider) to an airplane associated with the user's reserved flight ticket and/or boarding pass. The airplane (secondary remote enterprise system 180) will then store the content on its server 185 and make available the content to be accessed by the user in question. Additionally, in at least one embodiment of the invention, a content provider may elect to have all of its content available at the primary enterprise (for example, an entire Netflix® movie storage is available at an airport for faster download). At least one embodiment of the invention can utilize an authentication mechanism wherein a user provides his or her content provider password. At least one embodiment of the invention can utilize another authentication mechanism wherein the user inputs an authentication generated by the airline, such as boarding pass number.

The user, upon connecting to the airplane server 185 on his or her CSCD 110 (for example, via wireless network 188), can be queried for authentication and/or payment information so as to access the relevant user-specified and/or user-chosen content (which, as noted, has already been downloaded onto that server 185).

Figure 2:
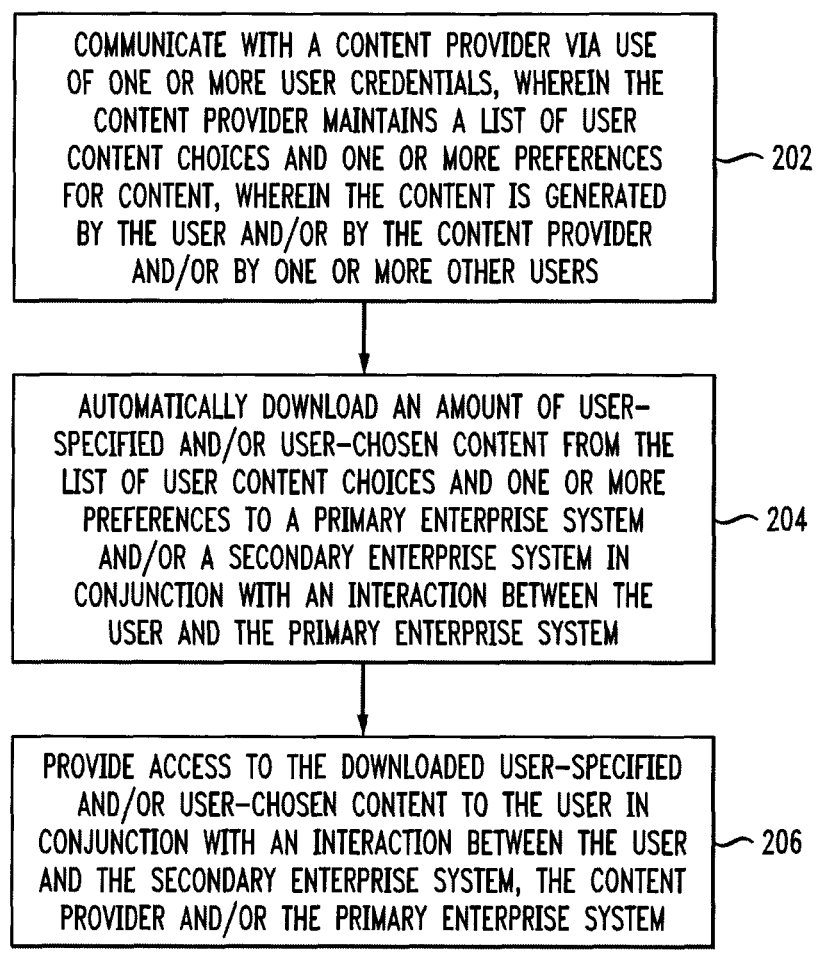
FIG. 2 is a flow diagram illustrating techniques for enabling user access to user-specified and/or user-chosen content at a remote location, according to an embodiment of the invention.

FIG. 2 is a flow diagram illustrating techniques for enabling user access to user-specified and/or user-chosen content at a remote location, according to an embodiment of the present invention. Step 202 includes communicating with a content provider via use of one or more user credentials (a password, a username-password combination, a security token, etc.), wherein the content provider maintains a list of user content choices and one or more preferences for content, wherein the content is generated by the user and/or by the content provider and/or by one or more other users. The content provider can also maintain one or more user preferences pertaining to the user-specified and/or user-chosen content. As noted herein, the user-specified and/or user-chosen content can include, for example, one or more of a movie, a television program, an Internet-based program, a website, an interactive game, an electronic book, an audio book, an electronic article, music programming, documents, etc.

Step 204 includes automatically downloading an amount of user-specified and/or user-chosen content from the list of user content choices and one or more preferences to a primary enterprise system and/or a secondary enterprise system in conjunction with an interaction between the user and the primary enterprise system. As detailed herein, automatically downloading can include automatically downloading a pre-determined number of content items from the user-specified and/or user-chosen content (for example, in a queue), automatically downloading a user-specified sub-set of the user-specified and/or user-chosen content, etc.

Additionally, in at least one embodiment of the invention, the secondary remote enterprise system is an individual airplane for which the user has made a flight reservation, and the interaction between the user and the primary enterprise system can include the flight reservation and/or generation of a boarding pass associated with the flight reservation.

Step 206 includes providing access to the downloaded user-specified and/or user-chosen content to the user in conjunction with an interaction between the user and the secondary enterprise system, the content provider and/or the primary enterprise system. In at least one embodiment of the invention, the interaction between the user and the secondary enterprise system can include querying the user for authentication and/or payment information. Also, providing access can include, in at least one embodiment of the invention, providing access to the downloaded user-specified and/or user-chosen content to one or more additional users, for instance, without revealing one or more user preferences of the user.

The techniques depicted in FIG. 2 additionally include determining user-specified and/or user-chosen content to download from one or more content providers across a plurality of users associated with the primary enterprise system via one or more secondary enterprise systems. Such determination can also include prioritizing the download of user-specified and/or user-chosen content shared and/or identified in connection with multiple of the plurality of users. Additionally, in an example embodiment wherein the primary enterprise system is an airline, the secondary remote enterprise system is an individual airplane associated with the airline, such a determination can include determining user-specified and/or user-chosen content to download at one or more flight reservation times and/or one or more flight check-in times.

Further, the techniques depicted in FIG. 2 can also include applying an enterprise policy (for example, no R-rated movies) to the user-specified and/or user-chosen content before or after download. Additionally, at least one embodiment of the invention can include informing the user (via email, text message, smart phone app, etc.) of the user-specified and/or user-chosen content to be downloaded prior to said automatically downloading, and/or informing the user of downloaded the user-specified and/or user-chosen content prior to the interaction between the user and the secondary enterprise system, the content provider and/or the primary enterprise system.

The techniques depicted in FIG. 2 can also include automatically predicting the user-specified and/or user-chosen content to be downloaded based on historical information pertaining to the user-specified and/or user-chosen content of the user.

Additionally, providing access to the downloaded user-specified and/or user-chosen content to the user can include providing such access via at least one user device. As detailed herein, a user device can include, by way of example, a mobile telephone, a personal digital assistant, a wireless email device, a game console, a tablet computer, a laptop personal computer, and/or an entertainment screen per user.

The techniques depicted in FIG. 2 can additionally include obtaining the user credentials that can be used to access an account of the user with the content provider, wherein said obtaining can occur during a first interaction between the user and the primary remote enterprise system. Accordingly, in at least one embodiment of the invention, the primary enterprise system is an airline, and the first interaction can include a flight reservation and/or generation of a boarding pass associated with the flight reservation.

Further, the techniques depicted in FIG. 2 can also include storing the user credentials on the primary enterprise system. Such storage can include storing the user credentials for a pre-determined amount of time, a use-based duration of time, and/or an indefinite amount of time. Additionally, at least one embodiment of the invention includes storing the downloaded user-specified and/or user-chosen content on the secondary enterprise system.

The techniques depicted in FIG. 2 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 2 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and operative to perform exemplary method steps.

Additionally, an aspect of the present invention can make use of software running on a general purpose computer or workstation. With reference to FIG. 3, such an implementation might employ, for example, a processor 302, a memory 304, and an input/output interface formed, for example, by a display 306 and a keyboard 308. The device depicted in FIG. 3 may be viewed as representing, for example, CSCD 110. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

As noted, aspects of the present invention may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, to partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 302. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, linking and airline's on-ground media servers to various content providers to enable a user to in-flight access his or her user-specified and/or user-chosen content as maintained by a content provider.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An article of manufacture comprising a non-transitory computer readable storage medium having computer readable instructions tangibly embodied thereon which, when implemented, cause a computer to carry out a plurality of method steps comprising:
   obtaining, via a primary enterprise system server, one or more user credentials for accessing an account of the user with a remote content provider, wherein (i) the primary enterprise system server comprises a ground system server of a transportation enterprise, and (ii) the remote content provider server comprises a server of a content provider enterprise that is distinct from the transportation enterprise;
   communicating, via the primary enterprise system server, with the remote content provider server via use of the one or more user credentials, wherein the remote content provider server maintains user content choices and one or more preferences for content, and wherein the content is generated by the user and/or by the remote content provider server and/or by one or more other users;
   automatically predicting, without user intervention, content to be downloaded from the remote content provider server based on analysis of historical information pertaining to user-specified and/or user-chosen content of the user, wherein said historical information is maintained on the remote content provider server;
   applying an enterprise policy to the predicted content before downloading from the remote content provider server, wherein the enterprise policy comprises applying a filtering mechanism based on content rating to the predicted content;
   automatically downloading, via the primary enterprise system server, (i) the predicted content that is in compliance with the enterprise policy from the remote content provider server and (ii) one or more preferences from the remote content provider server to the primary enterprise system server and/or a secondary enterprise system server in conjunction with an interaction between the user and the primary enterprise system, wherein the secondary enterprise system server comprises an on-board system server resident on a vehicle of the transportation enterprise; and
   providing access, via the primary enterprise system server and/or the secondary enterprise system server, to the downloaded predicted content to the user in conjunction with an interaction between the user and the secondary enterprise system and/or the primary enterprise system.

2. The article of manufacture of claim 1, wherein the user-specified and/or user-chosen content comprises one or more of a movie, a television program, an Internet-based program, a website, an interactive game, an electronic book, an audio book, an electronic article, music programming, electronic files and electronic documents.

3. The article of manufacture of claim 1, wherein the method steps comprise:
   determining content to download from one or more remote content providers across a plurality of users associated with the primary enterprise system via one or more secondary enterprise systems.

4. The article of manufacture of claim 3, wherein said determining comprises prioritizing the download of content shared and/or identified in connection with multiple of the plurality of users.

5. The article of manufacture of claim 1, wherein the method steps comprise:
informing the user of the downloaded predicted content prior to the interaction between the user and the secondary enterprise system, and/or the primary enterprise system.

6. The article of manufacture of claim 3, wherein the primary enterprise system comprises an airline, wherein the secondary remote enterprise system comprises an individual airplane associated with the airline, and wherein said determining comprises determining user-specified and/or user-chosen content to download at one or more flight reservation times and/or one or more flight check-in times.

7. The article of manufacture of claim 1, wherein said providing access comprises providing access to the downloaded predicted content to one or more additional users.

8. The article of manufacture of claim 1, wherein said obtaining comprises obtaining the one or more user credentials during a first interaction between the user and the primary enterprise system.

9. The article of manufacture of claim 8, wherein the primary enterprise system comprises an airline, and wherein the first interaction comprises a flight reservation and/or generation of a boarding pass associated with the flight reservation.

10. The article of manufacture of claim 1, wherein the method steps comprise:
storing one or more user credentials on the primary enterprise system.

11. The article of manufacture of claim 10, wherein said storing comprises storing one or more user credentials for a pre-determined amount of time, a use-based duration of time, and/or an indefinite amount of time.

12. The article of manufacture of claim 1, wherein said automatically downloading comprises automatically downloading a pre-determined number of content items from user-specified and/or user-chosen content.

13. The article of manufacture of claim 1, wherein the secondary remote enterprise system comprises an individual airplane for which the user has made a flight reservation, and wherein the interaction between the user and the primary enterprise system comprises the flight reservation and/or generation of a boarding pass associated with the flight reservation.

14. The article of manufacture of claim 1, wherein the interaction between the user and the secondary enterprise system comprises querying the user for authentication and/or payment information.

15. The article of manufacture of claim 1, wherein the method steps comprise:
storing the downloaded predicted content on the secondary enterprise system.

16. The article of manufacture of claim 1, wherein said providing access to the downloaded predicted content to the user comprises providing access to the downloaded user-specified and/or user-chosen content to the user via at least one user device.

17. A system for enabling user access to content at a remote location, comprising:
a memory; and
at least one processor coupled to the memory and operative for:
obtaining, via a primary enterprise system server, one or more user credentials for accessing an account of the user with a remote content provider, wherein (i) the primary enterprise system server comprises a ground system server of a transportation enterprise, and (ii) the remote content provider server comprises a server of a content provider enterprise that is distinct from the transportation enterprise;
communicating, via the primary enterprise system server, with the remote content provider server via use of the one or more user credentials, wherein the remote content provider server maintains user content choices and one or more preferences for content, and wherein the content is generated by the user and/or by the remote content provider server and/or by one or more other users;
automatically predicting, without user intervention, content to be downloaded from the remote content provider server based on analysis of historical information pertaining to user-specified and/or user-chosen content of the user, wherein said historical information is maintained on the remote content provider server;
applying an enterprise policy to the predicted content before downloading from the remote content provider server, wherein the enterprise policy comprises applying a filtering mechanism based on content rating to the predicted content;
automatically downloading, via the primary enterprise system server, (i) the predicted content that is in compliance with the enterprise policy from the remote content provider server and (ii) one or more preferences from the remote content provider server to the primary enterprise system server and/or a secondary enterprise system server in conjunction with an interaction between the user and the primary enterprise system, wherein the secondary enterprise system server comprises an on-board system server resident on a vehicle of the transportation enterprise; and
providing access, via the primary enterprise system server and/or the secondary enterprise system server, to the downloaded predicted content to the user in conjunction with an interaction between the user and the secondary enterprise system and/or the primary enterprise system.

* * * * *